Dec. 2, 1941.  H. R. SPERRY ET AL  2,264,959
LAYING BATTERY
Filed May 2, 1938     6 Sheets-Sheet 2

HOLLAND R. SPERRY.
REGINALD MacHAFFIE,
INVENTORS.

BY Frederic P. Warfield
ATTORNEY.

Dec. 2, 1941.   H. R. SPERRY ET AL   2,264,959
LAYING BATTERY
Filed May 2, 1938   6 Sheets-Sheet 5

HOLLAND R. SPERRY
REGINALD MacHAFFIE,
INVENTORS.

BY Frederic P. Warfield
ATTORNEY.

Patented Dec. 2, 1941

2,264,959

UNITED STATES PATENT OFFICE 2,264,959

LAYING BATTERY

Holland R. Sperry and Reginald MacHaffie, Avon, Conn., assignors to The Pope-Brooks Foundation, Inc., Avon, Conn., a corporation of Connecticut Application May 2, 1938, Serial No. 205,456

13 Claims. (Cl. 119—48)

While the device of our present invention will be referred to as a laying battery it should be understood at the outset that the various nests or cages which constitute part of the battery may be used for various other purposes, such for instance, as the isolation of ageing cocks, molting or ailing hens or special breeding purposes.

An object of the invention is to provide a laying battery in which all of the cages or nests are thoroughly ventilated and so designed that no cage can be contaminated by the droppings from a superjacent one. Preferably the battery includes a series of tiers of cages arranged in stepped relationship and having a common dropping board below them for the convenient removal of droppings from all of the cages.

Another object of the invention is to provide a laying battery so designed that all of the cages will receive full illumination from one light source and so that the birds in all of the cages may receive adequate irradition treatment from a second light source.

Another object is to provide a laying battery consisting of a series of cages from any of which a bird may be conveniently removed, and to provide cages separated from each other by removable partitions so that the size of the cage or nest may be conveniently increased for special mating purposes.

Another object is to provide a cleaning system for the common dropping board which may be operated either automatically or at will to effect thorough cleaning of the board. Preferably this system involves the use of a hopper for peat moss and phosphate with means for spreading this material over the board and with a scraper mechanism for removing the droppings and the peat moss and carrying this valuable by-product into a collecting receptacle.

Another object is to provide an automatic or semi-automatic watering system for the battery which will insure an adequate supply of fresh water at all times and which will prevent the water troughs from becoming fouled with food or other foreign material. Preferably this watering system includes a series of troughs which are slowly filled with water and which have discharge siphons associated with them so that when the water reaches a predetermined level rapid emptying of the troughs is effected. If desired, the siphon may withdraw water from individual wells in the bottoms of the troughs so that the troughs will be completely emptied and so that small particles of food or other foreign material will be drawn off with the water.

Another object of the invention is to provide a laying battery, the individual nests, or cages of which are designed to trap eggs in such a position that they may be very conveniently gathered.

Another object is to provide a laying battery consisting of a series of groups of nests, any and all of which may be very conveniently cleaned either by washing or spraying whenever it becomes desirable so to do. The nests are entirely of open work construction consisting of woven wire or welded wire or wire mesh walls and the entire laying battery is capable of convenient assembly.

Another object is to dispose the food troughs and water troughs for each tier of nests in such a fashion that they cannot be contaminated by the droppings from other nests.

Other objects of the invention are to provide a rugged, sturdy, durable, sanitary laying battery in which all of the individual nests afford facilities for the convenient feeding and watering of the fowls as well as providing them with perch facilities and complete illumination and thorough ventilation.

With the above noted and other objects in view, the invention may be more fully understood from the following description taken in connection with the accompanying drawings wherein:

Fig. 7 is an enlarged fragmentary perspective view showing the details of the scraper which is carried across the dropping board.

Figures 1, 2:
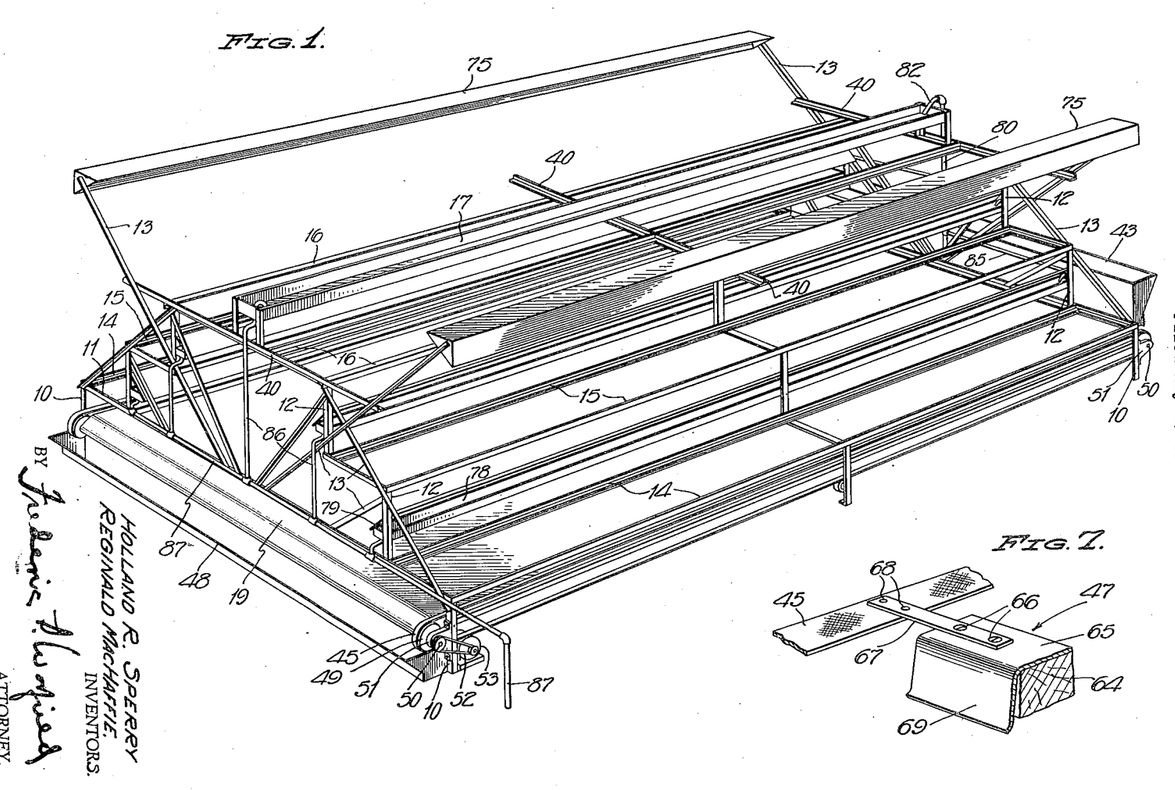
Fig. 1 is a perspective view of the frame work of our improved laying battery, upon which are mounted the illuminating means and the water troughs and under which is mounted the common dropping board with its automatic motor driven cleaning mechanism.
Fig. 2 is an end view of the laying battery showing the nests in place.
Figure 2:
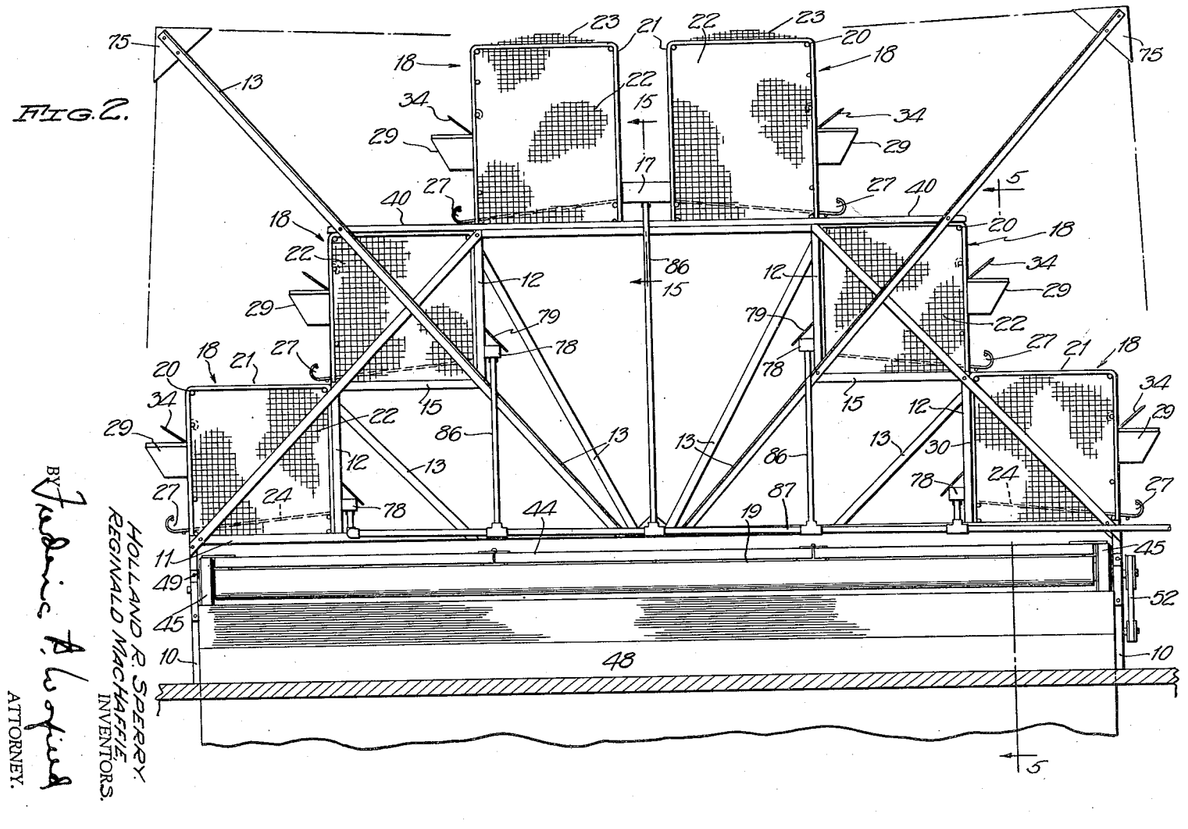

The skeletal frame structure for supporting the laying nests is shown in Fig. 1. This frame may be built up in many ways and Fig. 1 is merely typical of one of the preferred types of construction. Four corner uprights 10 support main cross bars 11 extending transversely of the battery at each end thereof. Supported on the bars 11, on uprights 12 and by angle braces 13 are two series of three cage receiving horizontal frames arranged in stepped formation. The lowest frame 14 of each series is supported on the ends of the cross bars 11 and the higher frames 15 and 16 are set back so that the nests which are carried by the uppermost frames 16 are disposed substantially back to back as seen in Fig. 2 with only the top water trough 17 between them. The frames 14, 15, 16 are thus disposed like the steps of a stile and the cages 18 which are supported on these frames are completely out of registration with or do not overlap a cage or nest below them. Thus the droppings from all of the cages will fall upon a common dropping board 19 extending the full width and length of the battery.

Figures 3, 5, 6:
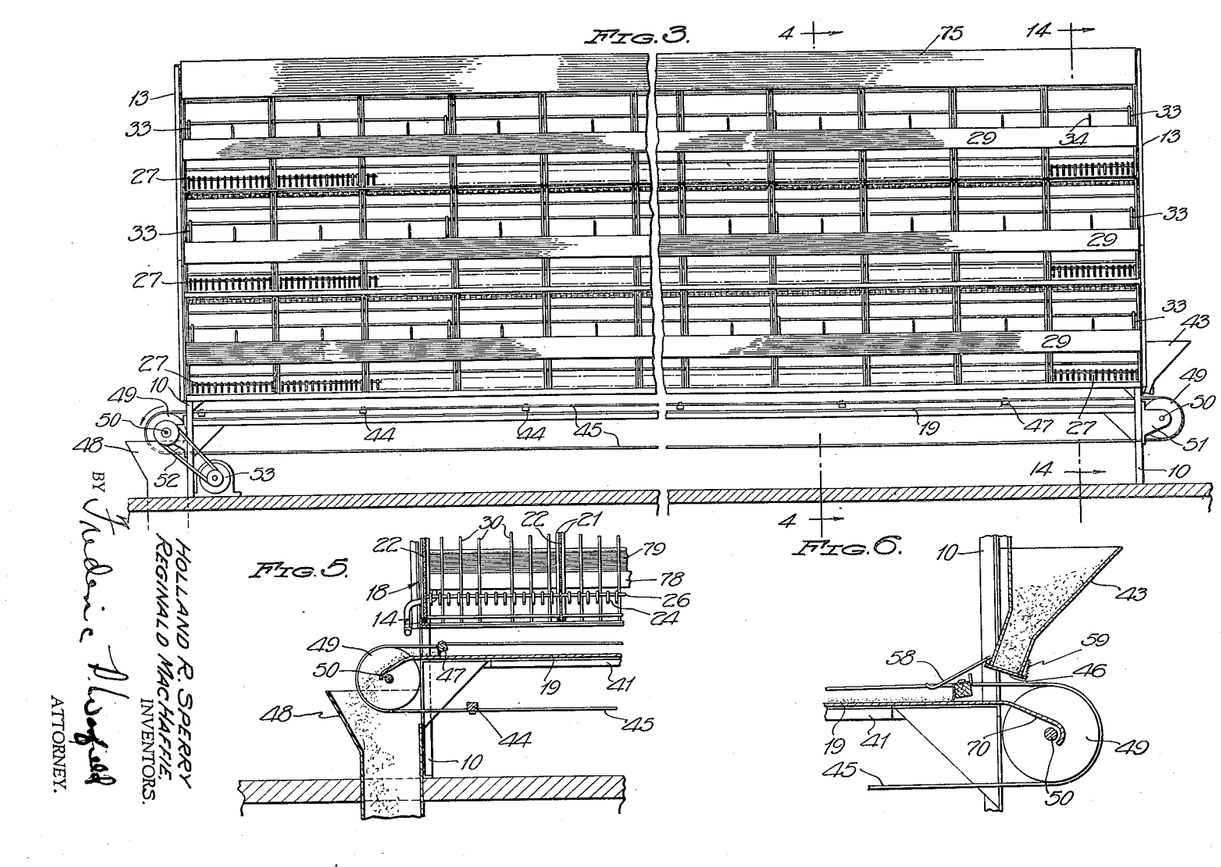
Fig. 3 is a broken front elevational view of the battery.
Fig. 5 is a vertical sectional detail through one lower corner of the battery taken on the line 5—5 in Fig. 2 and showing the discharged end of the dropping board.
Fig. 6 is a view similar to Fig. 5 but showing the opposite end of the dropping board with the peat moss hopper and the trap mechanism.
Figure 4:
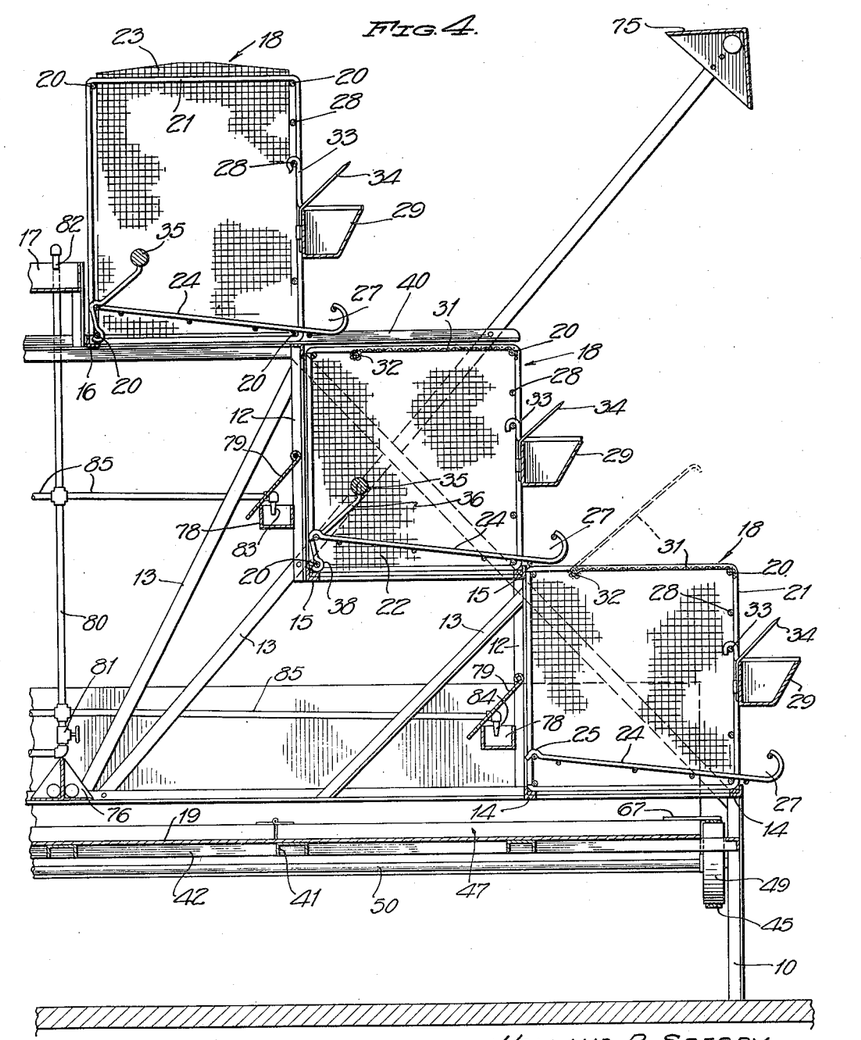
Fig. 4 is a fragmentary vertical sectional view taken on the line 4—4 in Fig. 3.

While the number of nests or cages used is subject to the requirements of the trade and the needs of the individual farmer we have shown a typical standard sized battery of seventy-two cages with twelve cages supported on each of the frames 14, 15 and 16. We find that these cages may be most conveniently made up and handled in units of six. The structural details of these units are best seen in Figs. 2, 3, and 4 and in the fragmentary partially disassembled perspective view Fig. 12.

Preferably the sets of six cages have common longitudinally extending top and bottom corner rods 20 and square frames 21 of bent rod stock are welded to these corner rods and define the side wall frames of the cages. These frames may permanently carry wire mesh walls 22 or two closely spaced adjacent frames 21 may afford a guide for a removable wire mesh partition 23 (Fig. 12) for a purpose which will be more fully hereinafter described. We have found that for most purposes it is desirable to use permanent side walls for the cages of the lower tiers of the battery and to use the removable partitions 23 only in the cages of the top tiers.

The cage floors 24 are preferably formed of an open-work woven or welded wire construction. The hooked rear ends 25 of some of these wires are adapted to engage a horizontal bar 26 extending across the rear of the cage above the rear lower corner rod 20. The floors (thus inclined) rest upon the lower front corner rods 20 and the forward ends of the floors are extended and turned upwardly to provide an egg trapping shelf 27. The floors are thus readily removable for cleaning purposes. Each cage or nest may have an individual floor or a common floor for all six cages of a unit may be employed.

A suitable number of horizontal rods or bars 28 extending across the front of the cages may cooperate with a hingedly or removably mounted feed trough 29 to block egress of the fowls through the fronts of the cages. Vertically disposed rods 30 at the rear of the cages serve a similar function.

Figure 12:
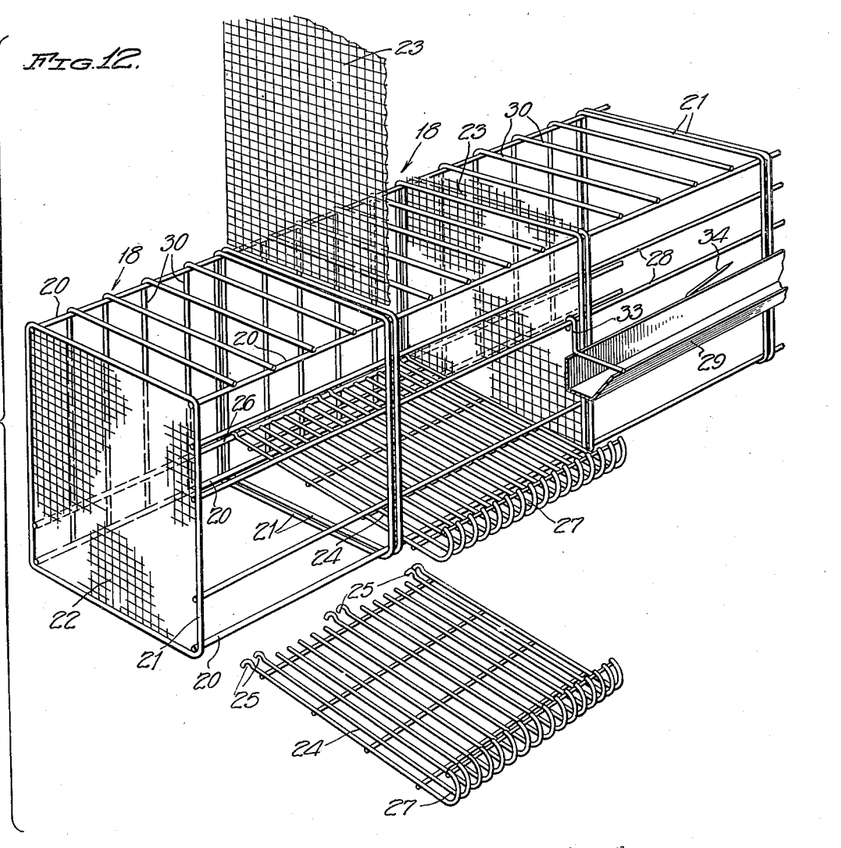
Fig. 12 is a partially disassembled fragmentary perspective view showing part of one set of cages and illustrating the manner in which the cage floors may be removed for cleaning and the cage partitions lifted out.

These bars may be extended forwardly at their upper ends to define a cage top, as shown in Fig. 12, or they may extend only a short distance over the cage and the cage top may consist of a wire mesh cover 31 (Fig. 4) hinged to a horizontal rod 32 to which the forwardly turned ends of rods 30 are welded or otherwise anchored.

Many means might be employed for hingedly or displaceably mounting the food troughs 29. Also these troughs may be individual for each cage or may extend the full width of six cages with or without transverse trough partitions. In a typical form of the invention the troughs extend the full width of the set of cages and carry hooks 33 hingedly engaged over one of the rods 28. The weight of the troughs swings them downwardly and inwardly against the fronts of the frames 21. The troughs aid in preventing escape of the hens through the front of the nests, and where no hinged nest cover is used the troughs serve as hinged doors through which the hens may be removed from the nests. At intervals along the troughs there are provided inclined impaling pins 34 upon which beets or similar feed may be conveniently secured.

Figure 13:
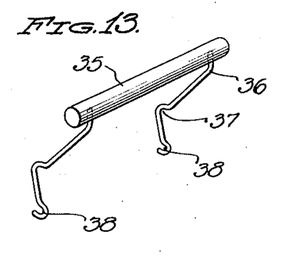
Fig. 13 is a perspective view of one of the removable perches.
Figure 14:
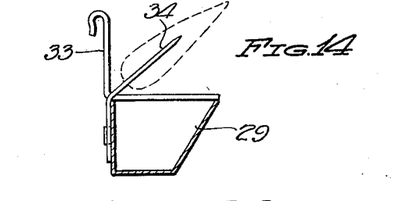
Fig. 14 is a fragmentary transverse sectional view along the line 14—14 in Fig. 3 through one of the hinged feed troughs and showing the arrangement of the impaling pin.

Preferably perching facilities are provided. As seen in Figs. 4 and 13 a perch 35 for each nest is secured to the upper ends of a pair of wire arms 36. The bent intermediate portions 37 of these arms embrace the rods 26 and the hooked lower ends 38 of the arms engage under rear lower corner rods 20 of the cages. Thus the perches are removably maintained in place, the weight of a hen on the perch serving, of course, only to hold it more firmly against its two anchor bars.

The frames 14 and 15 are preferably formed of upwardly facing angle irons and the cage units seat within these flanged frames and are held against sliding movement in any direction. For convenience in gaining access to the cages of the upper tiers we preferably mount these cages so that they can be slid forwardly over the cages of the intermediate tiers. Frames 16, therefore, present flat upper faces and the two ends of the two sets of six cages rest in horizontally disposed upturned angle irons 40 which extend laterally for a substantial distance over the intermediate tiers of cages and serve as tracks or rails along which the cage units of the upper tiers may be slid. These rails aid materially in bracing the frame structure.

The dropping board 19, preferably of sheet metal and preferably made of several removable sections is supported upon a plurality of longitudinal bars 41 having their ends secured to transverse frame bars 42 connecting the corner uprights 10. Secured to the skeletal frame work at one end thereof and extending across the end of the dropping board is a hopper 43 for absorbent materials such as peat moss and phosphate. A series of spreaders or distributors 44 carried by endless belts 45 are adapted to trip the tilting hopper bottom 46 and to spread the peat moss over the board mingling it with the droppings. These spreaders are followed by a scraper 47 also carried by the belts. The scraper carries the peat moss and droppings off the end of the board and into a pan or chute 48. This material forms a valuable by-product from the operation of the laying battery.

The endless belts 45 are arranged at opposite sides of the dropping board and travel around pulleys 49, mounted on shafts 50, journalled in brackets 51 (Figs. 1 and 3), carried by the uprights 10. One shaft 50 mounts a small driving pulley driven by a chain or belt 52 from an electric motor 53.

Figures 8, 9, 10, 11:
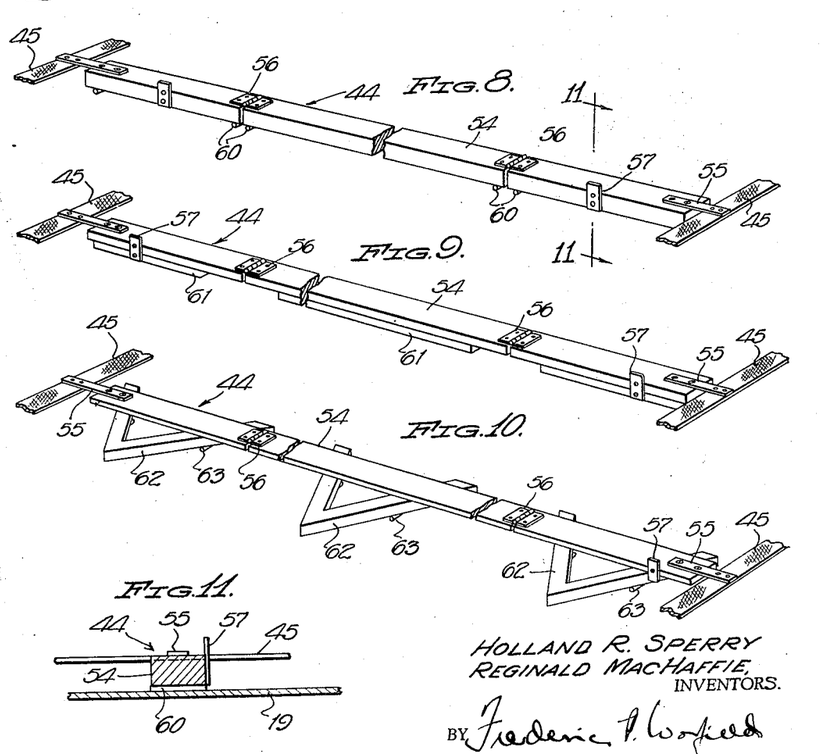
Figs. 8, 9, and 10 are perspective views illustrating several forms of peat moss spreaders which travel across the board in advance of the scraper.
Fig. 11 is a vertical sectional view taken on the line 11—11 of Fig. 8.

The spreaders and scraper are all mounted within the length of one run of the belts so that between cleaning operations they may lie under the dropping board and will not be soiled by the droppings. The spreaders may take many forms, three of which are illustrated in Figs. 8, 9 and 10. Each spreader in all forms of the invention is preferably in the form of an elongated wooden bar 54 attached to the two belts 45 by straps 55 at its ends. Preferably the bar 54 is made of a plurality of sections connected by hinges 56 so that the bar will closely follow the surface of the dropping board even though some warping of the bar sections or sagging or buckling of the dropping board should occur. To trip the tilting hopper bottom 46 the trailing edges of the spreaders 44 carry upstanding brackets or trip fingers 57 to engage a lever 58 attached to the hopper bottom and effect slight opening of the hopper bottom and gravitational deposit of some of its contents on the dropping board. A spring 59 effects closing of the hopper bottom as the fingers 57 pass out of engagement with the levers 58.

Other structural details of the spreader bars may vary considerably as indicated by the various embodiments of the invention shown in Figs. 8, 9 and 10. In Fig. 8 the relatively thick bar 54 rides on small runners 60 which slide easily over the surface of the dropping board. In Fig. 9 a thinner bar 54 carries spaced spreader shoes 61 which ride on the dropping board. In Fig. 10 V-shaped spreader shoes 62 carried by the board or bar 54 mount runners 63 to ride on the dropping board.

The details of the scraper appear most clearly in Fig. 7. This scraper consists of an elongated wooden bar 64 having a piece of metal 65 of substantially L shape in cross section secured upon the top thereof, as by the screws 66 which secure ends of the bar 64 to metal straps 67, the other ends of these straps being riveted or otherwise secured as at 68 to the belts 45. Forwardly of the bar 64 one flange of the member 65 is bent downwardly and slightly curved in cross section to afford a scraper shoe 69. As the scraper is drawn across the dropping board the shoe tends to cant forwardly and maintain close scraping contact with the board to be cleaned.

When the motor is started the spreader bars are drawn out from under the dropping board and carried over into the top side of it, the board having a curved and inclined end at 70 (Fig. 6) to facilitate the guiding of the spreader onto the top thereof. As the spreaders pass under the hopper 43 they cause peat moss to be discharged and serve to spread this rather uniformly over the board. The spreaders are followed by the scraper which scrapes the moss and the dropping into the chute 48. As the scraper passes back under the board the motor is stopped either manually or automatically leaving all of the spreaders and the scraper in concealed position under the board and out of the path of new droppings. This cleaning operation may be repeated either selectively or automatically at frequent or infrequent intervals as is thought desirable. We may also so arrange the scraper and spreaders that the scraper passes over the board first to clean it and is then followed by the spreaders to deposit a new layer of peat moss on the board to receive droppings which may fall prior to the next cleaning operation. This practice is preferable in that it minimizes odors between cleaning operations.

Light batteries are supported in the frame structure both for providing the desired illumination and for treating the birds with ultra-violet or other therapeutical light. Two pairs of the angle braces 13 extend upwardly and forwardly to a point approximately above the fronts of the lower tiers of cages and at about the level of the top of the upper tiers of cages. At these points 90° angle reflector boxes 75 connect the upper ends of the braces. In these reflectors are mounted batteries of ordinary lamps which throw light downwardly through the fronts and tops of the cages.

The most effective way to treat the birds with ultra-violet light is to play it upwardly under them since their legs are most sparsely feathered and it is not desirable to subject the birds' eyes to this light. This is accomplished by the use of 90° reflector boxes 76 (Fig. 4) disposed between the two sections of the battery at approximately the level of the bottoms of the lower tiers of cages and in a vertical plane approximating that of the backs of the upper tier of cages. Ultra-violet lamps in these reflectors throw the light upwardly and outwardly. All of the cages are disposed at about an equal distance from these lamps and therefore the rays reaching all of the birds are of about the same intensity. Automatic time switch control of light batteries as well as the motor is within the scope of this invention, although such automaticity is not vital and no switching means, either automatic or otherwise, has been shown.

Back of each tier of cages there is provided a water trough, these troughs being secured in any suitable manner upon the framework of the battery. The uppermost trough 17 is common to the two top tiers and requires no cover but the troughs 78 for the lower tiers are exposed to the droppings from superjacent cages and must be protected. Hinged inclined covers 79 as shown in Fig. 4 may serve this purpose.

We provide a water supply system for the troughs by which they may all be slowly filled. As the water level in the troughs rises to a predetermined point, automatic emptying of the troughs is effected, preferably by siphonic means and in such a fashion that fragments of feed or other foreign matter which may find their way into the troughs are carried to waste through the siphon pipes.

Figure 15:
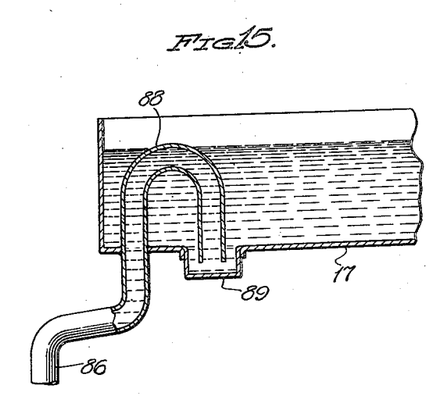
Fig. 15 is a detailed vertical sectional view on the line 15—15 in Fig. 2 showing the relation of the discharge siphon and the collecting well to the water trough.

The water distributing system appears most clearly in Figs. 2 and 4, the water discharge system in Fig. 1 and the details of the siphon in Fig. 15. The water flows into a riser pipe 80 controlled by a valve 81. This riser terminates in a spout 82 having a relatively restricted outlet and dripping into the trough 17.

Branch pipes 85 from the riser terminate in spouts 83, 84 delivering into the ends of the troughs 78 of the middle and lower tiers of cages respectively. Spouts 83 are of more constricted cross section than spout 82 and spouts 84 are still further restricted. The purpose of this varying restriction in the cross sectional area of the spouts is to assume a substantially uniform flow of water to or filling of all of the troughs. The rate of filling may be controlled by the hand valve 81.

At the ends of the troughs remote from the inlet spout each trough is equipped with a siphon discharge pipe 88. As shown in Fig. 15 the top of the siphon pipe bend is below the top of the trough and the inlet or siphon mouth is disposed below the level of the main trough bottom and in a well 89 in which foreign matter collects or into which it is drawn as the water flows toward the siphon mouth. All of the siphon pipes deliver through vertical drain pipes 86 to a common waste pipe 87.

With an extremely slow flow of water into the troughs the siphons will serve as ordinary overflow pipes but with a reasonably rapid flow or a suddenly induced rapid flow such as might be accomplished by turning valve 81, complete siphoning of the entire contents of the water troughs may be effected.

Figure 16:
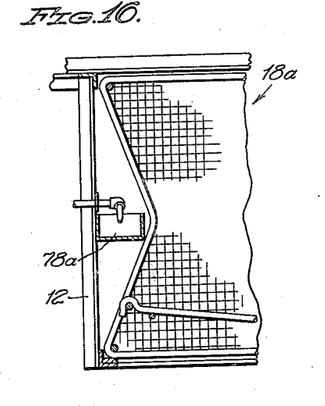
Fig. 16 is a fragmentary vertical sectional view through a slightly modified type of cage in which the water trough is arranged within a recess in the back wall of the cage.

In Fig. 16 we have shown an alternative method of guarding the water troughs against contamination by droppings from an upper tier of cages. In this instance a nest 18a of construction generally similar to the previously described nests 18 has its rear wall bent inwardly to afford space for a trough 78a corresponding to trough 78. Thus the trough like the nest itself is completely out of the path of droppings from a higher nest.

It will be apparent that the so called battery "unit" herein illustrated consists of two thirty-six cage, three-tiered units arranged back to back and having a common supporting frame and cleaning and watering system. Obviously half of the battery shown here could be built as a unit and placed against the wall of a building instead of on a more central floor space.

By making the cages of the top tiers slightly larger than the others and by providing the removable partitions 23 more space and comfort may be provided by birds isolated in these cages. Also adequate room for special matings may be afforded by removing one of the partitions and thus doubling the size of a cage.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having thus described our invention, what we claim as new and desire to secure by Letters Patent is:

1. A laying battery including a plurality of tiers of cages having open work bottoms, said tiers being arranged in stepped non-overlapping relationship and a common dropping board under all of the tiers.

2. A laying battery including a plurality of tiers of open work cages, said tiers being arranged in stepped relationship, a common dropping board under all of said tiers, means for mounting a source of therapeutical light above said battery, and reflecting means for said light.

3. A laying battery including a skeletal frame work, a plurality of tiers of open work cages supported in stepped relationship on the frame work, and a dropping board under the frame work receiving droppings from all of the cages.

4. A laying battery including a skeletal frame work, a plurality of tiers of open work cages supported in stepped relationship on the frame work, a dropping board under the frame work receiving droppings from all of the cages, a hopper for absorbent material arranged above one end of the dropping board and means movable over the dropping board for discharging said absorbent material from the hopper and spreading it over the board.

5. A laying battery including a skeletal frame work, a plurality of tiers of open work cages supported in stepped relationship on the frame work, a dropping board under the frame work receiving droppings from all of the cages, a hopper for absorbent material arranged above one end of the dropping board, means movable over the dropping board for discharging said absorbent material from the hopper and spreading it over the board, and a scraper movable over the board to effect removal of the droppings and absorbent material.

6. A dropping board and cleaning mechanism for laying batteries or the like including a plate to receive droppings, an absorbent material hopper arranged above one end of the plate, a pair of endless belts extending longitudinally of each edge of the plate, a plurality of spreaders carried by the belts and including means for releasing said absorbent material from the hopper as the spreaders pass under the hopper, and a scraper carried by the belts adapted to remove droppings and peat moss from the board.

7. A dropping board and cleaning mechanism for laying batteries or the like including a plate to receive droppings, an absorbent material hopper arranged above one end of the plate, a pair of endless belts extending longitudinally of each edge of the plate, a plurality of spreaders carried by the belts and including means for releasing said absorbent material from the hopper as the spreaders pass under the hopper, and a scraper carried by the belts adapted to remove droppings and absorbent material from the board, said spreaders and scraper being carried by one-half of the length of the belts so that they may be disposed under the board when not in use.

8. A laying battery including two sets of stepped tiers of cages arranged back to back, a common dropping board extending under all of the cages, a hopper for absorbent material on one end of the dropping board, means for discharging material from said hopper and spreading the same over the dropping board, a collecting receptacle arranged adjacent the opposite end of the dropping board and a scraper for removing the deposits on the dropping board and advancing them into the receptacle.

9. A laying battery including a skeletal frame work, a plurality of tiers of open work cages supported thereon back to back in stepped relationship, a plurality of water troughs arranged at different levels, means for slowly feeding water into all of the troughs at a substantially uniform rate, and siphon means for automatically rapidly emptying the troughs when the water therein reaches a predetermined level, each of said troughs having a well into which the siphon mouth dips whereby foreign matter in the trough is drawn into the well and carried off by the siphon, said watering troughs extending the full length of each tier of cages and disposed behind the cages, the rear sides of the cages being indented to accommodate the watering troughs and thereby protect the troughs from contamination by droppings from a superimposed stepped tier of cages.

10. A set of cages for a laying battery including a plurality of rectangular wire frames arranged in alignment with corresponding sides of different frames substantially parallel, a plurality of wire members extended transversely of said frames at the corners and at the front and back thereof and rigidly attached to all of said frames, a plurality of wires extending from front to back between the upper corner members to form the top of said cages and providing openings from front to back to permit insertion of partitions, removable wire partitions mounted parallel to said frames between certain of said top wires to separate the space encompassed by said frames and wires into a plurality of cages, and a plurality of removable openwork floors, one for each cage, each having an upper surface comprising a plurality of parallel wire rods extending from back to front of its respective cage, some of said rods being provided with hooks at their rear ends adapted to engage over one of said wire back members and all of said rods extending at their front ends to form egg retaining shelf means, said floors sloping towards the front of said cages.

11. A laying battery comprising a plurality of tiers of cages all the sides and the top and bottom of which are formed of spaced members having relatively small cross section so as to offer substantially no resistance to the movement of air through said cages, skeletal means to support said tiers in stepped non-overlapping relationship, and a common dropping board under all of said tiers and spaced below the bottom of the lowermost cages so as not to interfere with the ventilation of any of said cages.

12. A laying battery comprising a plurality of tiers of cages, all sides of which are formed of spaced members having relatively small cross section, so as to offer relatively little obstruction to light rays, skeletal means to support said tiers in stepped non-overlapping relationship, and a plurality of illuminating lamps arranged in a single row parallel to said tiers and spaced substantially in a horizontal plane through the top of the uppermost tier and in a vertical plane through the front of the lowermost tier, whereby each of said cages receives full illumination from said lamps without being shaded by portions of any other cage.

13. A laying battery comprising a plurality of tiers of cages, all sides of which are formed of spaced members having relatively small cross section, so as to offer relatively little obstruction to light rays, skeletal means to support said tiers in stepped non-overlapping relationship, a plurality of illuminating lamps arranged in a single row parallel to said tiers and spaced substantially in a horizontal plane through the top of the uppermost tier and in a vertical plane through the front of the lowermost tier, whereby each of said cages receives full illumination from said lamps without being shaded by portions of any other cage, and a plurality of ultra-violet lamps arranged in a single row parallel to said tiers and spaced substantially in a vertical plane through the rear of the uppermost tier of cages and in a horizontal plane through the bottom of the lowermost tier of cages, whereby every cage is subjected to full ultra-violet radiation without being shaded by portions of any other cage.

HOLLAND R. SPERRY.
REGINALD MacHAFFIE.

CERTIFICATE OF CORRECTION.

Patent No. 2,264,959. December 2, 1941.

HOLLAND R. SPERRY, ET AL.

It is hereby certified that error appears in the printed specification of the above numbered patent requiring correction as follows: Page 4, second column, line 47, claim 6, for "peat moss" read --absorbent material--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.